Aug. 3, 1965

H. W. BOTELER 3,198,205

DIAPHRAGM VALVE

Filed Oct. 14, 1963

INVENTOR.
HENRY W. BOTELER
BY
*David D. McKenney*
ATTORNEY

INVENTOR.
HENRY W. BOTELER
BY David R. McKenney
ATTORNEY

Aug. 3, 1965 H. W. BOTELER 3,198,205
DIAPHRAGM VALVE
Filed Oct. 14, 1963 5 Sheets-Sheet 4

INVENTOR.
HENRY W. BOTELER
BY
ATTORNEY

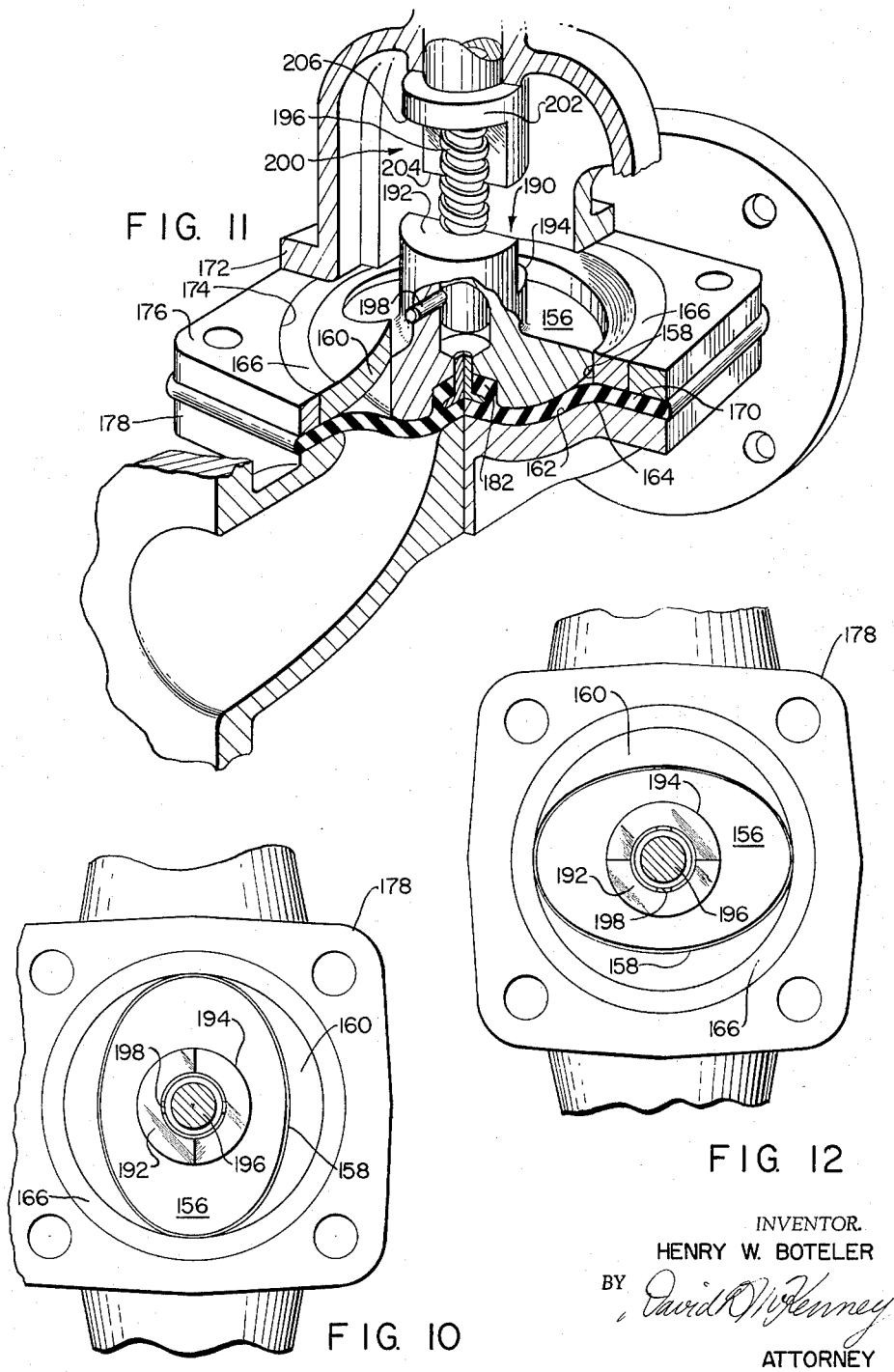

United States Patent Office 3,198,205
Patented Aug. 3, 1965

3,198,205
DIAPHRAGM VALVE
Henry W. Boteler, East Greenwich, R.I., assignor to Grinnell Corporation, Providence, R.I., a corporation of Delaware
Filed Oct. 14, 1963, Ser. No. 315,912
23 Claims. (Cl. 137—270)

This invention relates to improvements in diaphragm valves. More particularly, it has to do with diaphragm valves in which the diaphragm periphery is sealingly clamped to the rim of the diaphragm opening, in which the valve is closed by pressing the central portion of the diaphragm against a seat opposite the opening, and in which parts of the central diaphragm portion are clamped to parts of the seating in open positions of the valve.

The kind of diaphragm valve in which the present invention finds its greatest utility is that in which the seat is a concave weir extending across the diaphragm opening and having its ends curving upward to blend into the rim therearound. In such a valve the invention appears as a clamping of the diaphragm central portion to those parts of the curved weir ends which are adjacent the opening rim during at least some of the open positions of the valve.

It frequently happens in the design of industrial piping systems that the initial capacity will be small, but the later increases in capacity are expected. One obvious design solution in this situation would seem to be the specification of pipe and valves large enough to accommodate the increases and initial operation of such valves in their nearly closed positions. The difficulty with this solution is that when prior art diaphragm valves are operated in their nearly closed positions there are a number of problems which can arise. One of these is undue wear at the curved ends of the weir caused by the high velocities which are attained over the weir when a diaphragm is opened only slightly. It would be preferable to avoid this wear or "wire drawing," as it is sometimes called, along all portions of the weir, but it is particularly troublesome at the weir ends where the seating surfaces are at significant angles to the direction of diaphragm movement. At these places squeezing the diaphragm against a worn seating surface is less effective in achieving tight sealing than at the center of the weir.

Another problem arises with nearly closed operation of prior art diaphragm valves when the liquid being controlled contains suspended solids, and in effect it is the filtering of these solids at the very narrow opening between diaphragm and seat. The liquid itself may get through in the amounts required but the solids are often stopped, and the result is either eventual plugging of the lines at the valves or, at best, variation in solid concentration when the valve is open further.

Still another problem resulting from the use of nearly closed diaphragm valves of the prior art is the poor flow control in these positions in the sense that small diaphragm movements in these positions result in relatively large percent changes in flow. The reason for this, of course, is the fact that the opening length does not change but only the distance of the diaphragm from the seat, so that when the valve is nearly closed a very small movement of the diaphragm has a large effect on the size of the flow area at the seat. As distinguished from such prior art flow characteristics for diaphragm valves, the ideal characteristics for control valves is a so-called "equal percent curve" which means that for any given flow valve within the range of the valve a certain stem movement produces the same percentage change in flow.

Another design solution for the system, mentioned earlier, which is initially run at low capacity, later at full capacity, is the use of diaphragm valves in parallel or "cascaded" as it is sometimes called. The low capacity could be handled by one valve and others opened as the demand increased.

One obvious difficulty with this solution is the resulting complexity of pipe and fittings. Another difficulty is in the proper relation of actuators and positioners where the valve control is remote or automatic, and still another difficuty is in additional labor required for servicing a plurality of valves rather than one.

The present invention affords an excellent solution to the design problem above presented and avoids the difficulties enumerated by providing a diaphragm valve which is convertible from a small size to a larger size without changing the body or diaphragm, or if desired without changing the body, diaphragm or bonnet, and the changes which are required for this conversion are relatively inexpensive.

One example of an embodiment of the present invention has the body, diaphragm and bonnet of a prior art weir-type diaphragm valve to which there has been added a special plate clamped between the bonnet and diaphragm and a special compressor. The plate has a portion which overlies parts of the curved weir ends and clamps the diaphragm thereagainst at all times so that only the remaining portions of the diaphragm central portion are involved in the motion to and from the remainder of the weir. The compressor is shaped to accommodate the inwardly extending portions of the plate. Other examples include the use of a bonnet having the described plate integral therewith and the use of a plate which can be adjusted to achieve greater or lesser amounts of permanent clamping of the diaphragm against the curved weir ends.

In view of the foregoing and of the description which appears hereinafter it is one object of the present invention to provide an improvement for a diaphragm valve of the kind in which a peripheral portion of the diaphragm is intended to be permanently sealingly clamped to the body by a member, in which a central portion is intended to be intermittently squeezed against and lifted from a seat in the body to close and open the valve, the improvement comprising permanently sealingly clamping to the seat a part of the central diaphragm portion.

Another object is to provide a diaphragm valve of the kind described in which the seat is a weir extending across a diaphragm opening and curving at the ends to blend with the opening rim and in which the part of the central diaphragm portion is clamped to the curved weir ends.

Another object is to provide a diaphragm valve of the kind described in which the part of the central diaphragm portion is clamped against the curved weir ends by a member separate from but fixed with respect to the member which clamps the diaphragm periphery.

Another object is to provide a diaphragm valve in which the part of the central diaphragm portion is clamped against the curved weir ends by an integral part of the member which permanently clamps the diaphragm peripheral portion.

Another object is to provide a diaphragm valve in which the part of the central diaphragm portion clamped against the weir ends is adjustable to change the amount of such clamping.

Another object is to provide a diaphragm valve wherein the compressor is shaped to engage those parts of the central diaphragm portion which are adjacent the weir and which are not otherwise clamped.

Another object is to provide a diaphragm valve wherein the weir-end clamping is achieved by a separate member in the form of a plate, wherein the compressor has an oval shape and wherein the plate has an oval opening in which the compressor fits.

Another object is to provide a diaphragm valve wherein the weir-end clamping is achieved by a plate, wherein the compressor is circular and wherein the plate has a circular opening into which the compressor fits.

Another object is to provide a diaphragm valve wherein the weir-end clamping is achieved by a plate and wherein the portions of this plate apart from those adjacent the weir ends conform substantially to the configuration of the diaphragm in its open position.

Other objects will appear hereinafter.

The best mode in which it has been contemplated applying the principles of the present invention are shown in the accompanying drawings, but these are to be deemed primarily illustrative for it is intended to cover by suitable expression in the appended claims whatever of patentable novelty exists in the invention disclosed.

In the drawings:

FIGURE 10 is a top plan view of certain parts of the device of FIG. 9;

FIGURE 11 is like FIG. 9 but showing certain parts in alternative positions;

FIGURE 12 is like FIG. 10, but of the arrangement of FIG. 11; and

Figure 1:
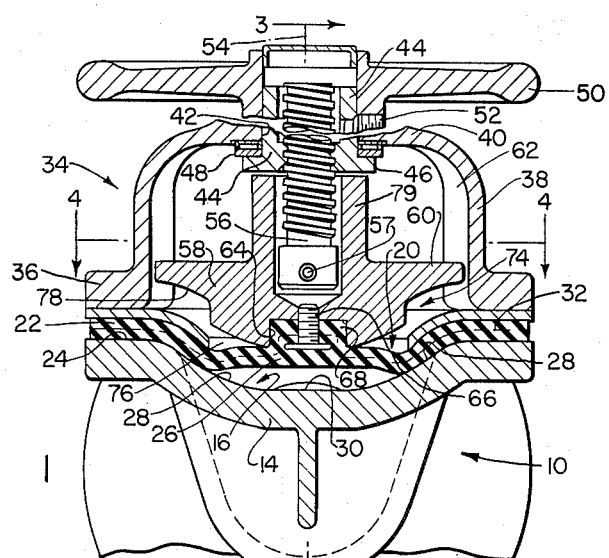
FIGURE 1 is an end elevation view of one embodiment of the present invention in a weir-type diaphragm valve shown in the open position.
Figure 2:
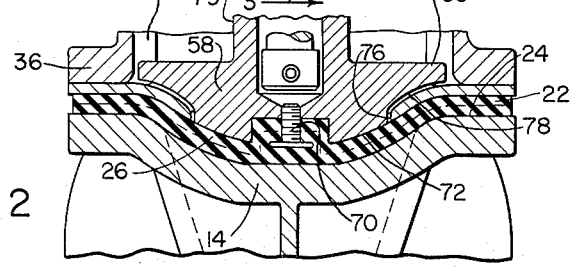
FIGURE 2 is a view like FIG. 1, but showing the valve in the closed position.
Figure 3:
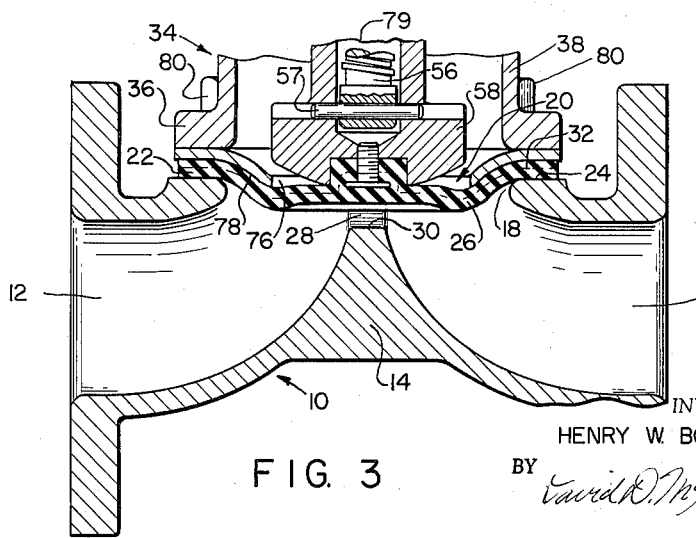
FIGURE 3 is a side elevation view taken on line 3—3 of FIG. 1.
Figure 4:
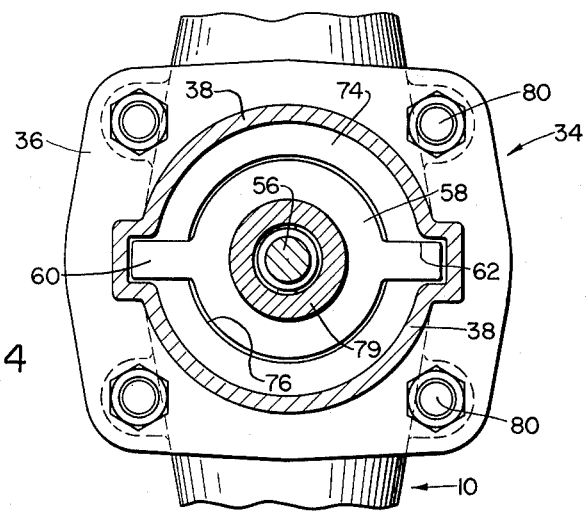
FIG. 4 is a plan view taken on line 4—4 of FIG. 1.

Referring now more particularly to the drawings, FIGS. 1 to 4 illustrate one embodiment of the present invention in which there is a body 10 having a passage 12 therethrough interrupted by a transverse weir 14, the top surface 16 of which is presented toward an opening 18 in the side of the body. This opening is covered by a diaphragm 20 the periphery 22 of which lies in a substantially flat plane and is clamped to the rim 24 of the opening. The diaphragm center 26 is so shaped that it can be bulged away from the weir and provide a valve opening thereover and also is so shaped that it can be pressed against the weir without folds or undue stretching to close the valve.

The weir is concaved below the body rim 24 and has its curved end portions 28 extending upward to blend smoothly therewith and similarly extending downward to blend smoothly with a generally flat weir portion 30 at the center of the valve.

The diaphragm is customarily molded of rubber or rubber-like material with one or more layers of fabric reinforcement 32 therein. The molded shape may be that of FIG. 1, but for reasons which will be explained later herein the molded shape will probably be that of FIG. 2 or 5, because these are the shapes of the prior art diaphragms, and it is one of the outstanding features of this invention that novel valve characteristics are available using a considerable number of prior art valve parts.

More particularly, the valve body 10 and diaphragm 20 thus far described are of conventional design, and the bonnet 34 can have the usual configuration for the body and diaphragm shown. For example, the bonnet has a lower flanged end 36 which is presented toward and co-extensive with the flat diaphragm periphery 22. From this end 36 the bonnet extends upwardly in the form of a cylindrical wall 38 to an end wall 40 which has an opening 42 therein forming a journal for a bushing 44. This bushing has its lower end flanged at 46 to retain a thrust bearing 48 against the wall 40. The upper end of the bushing projects out of the opening 42 and has a handwheel 50 secured to it by a set screw 52.

The opening 42, and hence the bushing 44, is aligned with the bonnet axis 54 so that the valve stem 56 threaded into the bushing 44 moves toward and away from the body when the handwheel is rotated and the stem is prevented from rotating. The stem is prevented from rotating by a pin connection 57 at its lower end to a compressor 58 which has arms 60 extending to bonnet grooves 62 and lying therein for free vertical movement. The bottom of the compressor has a recess 64 and threaded hole 66 which accommodate a boss 68 on the back side of the diaphragm 20 and a stud 70 embedded in the boss. The bottom surface 72 of the compressor is contoured to press part of the diaphragm center against the weir and stop the flow of fluid. More particularly, this surface is coextensive with the weir flat portion 30 and parts of the curved weir end portions 28 adjacent thereto.

In accordance with this invention the remaining parts of the curved weir end portions extending up to the opening rim 24 have the diaphragm squeezed against them by an annular plate 74 which has its outer periphery clamped between the diaphragm periphery 22 and the bonnet flange 36. This plate follows the contour of the weir over which it lies and is sufficiently rigid so that the diaphragm is sealingly clamped all the way to the inner edge 76 of the plate.

The undersides 78 of the opposed arms 60 are located out of engaging with the plate 74 when the compressor 58 is in its closed position.

A boss 79 on the upper side of the compressor 58 is of such height that it engages bushing 44 when the diaphragm is pulled as far open as is practical.

The bonnet 34 is held in the position shown by bolt and nut assemblies 80 which pass through holes in the bonnet flange 36, through corresponding holes in the diaphragm periphery and through corresponding holes in the body around the opening rim.

From the foregoing it will be seen that the plate 74 has the effect of clamping the diaphragm to outer parts of the curved weir end portions 28 with the result that the part of the diaphragm center which is free to move is much smaller than was originally intended in the initial design of the body, bonnet and diaphragm. As a consequence, by providing a special compressor 58 a small valve has been supplied in a large valve assembly. The advantages of such a result are obvious when it is understood that many installations which are destined for large capacities are initially intended to be run at small fractions of such capacities. Reference has been made earlier herein to the disadvantages of operating prior art diaphragm valves in their nearly closed positions.

For a better understanding of the invention as embodied in FIGS. 1 to 4, FIG. 5 has been included to show the prior art diaphragm which is, for example, the same as FIGS. 1 to 4 without the plate 74 and with a different compressor 82. This compressor extends all the way to the clamped flat diaphragm peripheral portions 22, or in other words it overlies all of the curved weir end portions 28 as well as the flat weir center portion. In fact with the vertical grooves 62 on the inner bonnet surfaces adjacent the ends of the weir the compressor 82 actually extends over part of the flat peripheral portion 22 in the form of "long arms" which lie in these grooves. Unlike the embodiment of FIGS. 1 to 4 the undersides of the compressor engage the diaphragm in the closed position all the way to the ends of these long arms.

Figure 6:
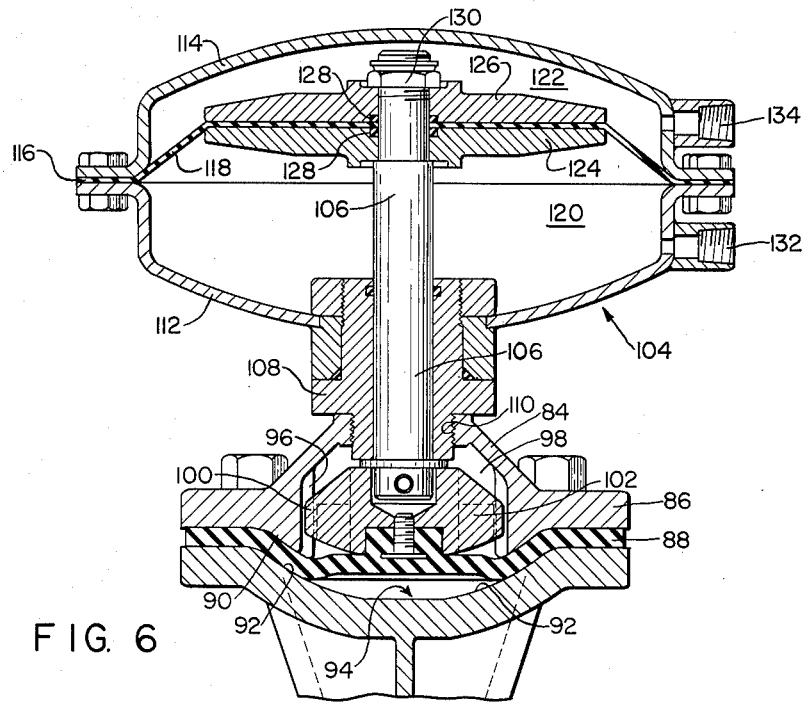
FIGURE 6 is a cross-sectioned end elevation view of another embodiment of the present invention in a weir-type diaphragm valve shown in open position and provided with an actuator.

FIGURE 6 illustrates an embodiment of the invention in which it is economical to furnish a special bonnet. It also shows how an actuator might be provided. The special bonnet 84 has flange 86 which overlies the flat diaphragm peripheral portion 88. However, unlike the prior art bonnets the flange 86 has surface portions 90 which curve over the outer parts of the outer curved end portions 92 of the weir 94 and which clamp parts of the diaphragm center portion to these weir parts. The result is that a reduced amount of the diaphragm is available for movements to open and close the valve.

As in the prior art diaphragm valves, the bonnet 84 has vertical grooves 96 on the inner bonnet surface 98 and receiving therein the "long arms" 100 on the compressor 102. These long arms are located in line with the weir so that the grooves terminate adjacent the weir. If desired the grooves 96 may be located at any other positions around the bonnet.

Because an actuator 104 is employed, rather than a handwheel, the stem 106 is not threaded but merely slides vertically in the bushing 108 which in this embodiment is threaded into an aperture 110 in the upper bonnet end. The actuator 104 is mounted on the upper end of the bushing 108. This actuator comprises a pair of casing halves 112 and 114 which clamp between them the periphery 116 of a diaphragm 118 separating the actuator interior into two chambers 120 and 122. The center of the diaphragm 118 is clamped between two plates 124 and 126 which are apertured to receive the upper end of stem 106. This upper stem end also passes through an aperture at the center of the diaphragm and accordingly O-ring seals 128 are provided to prevent pressure leakage from one chamber to the other. A nut 130 threaded onto the upper stem end holds together the plates 124 and 126 and the center of the diaphragm 118. Fluid pressure connections 132 and 134 provide inlet and exhaust ports for chambers 120 and 122, respectively.

Figure 5:
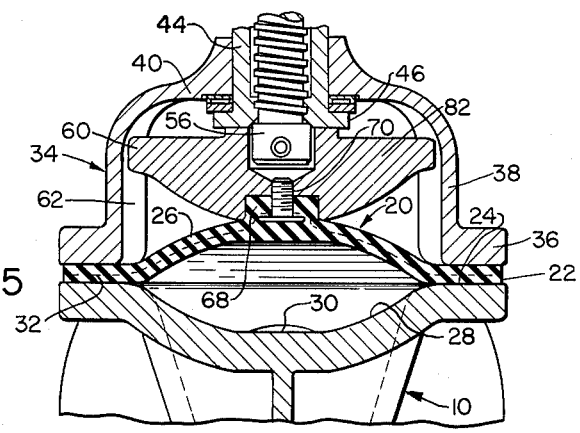
FIGURE 5 is a view like FIG. 1 but showing how removal of the added structure of the invention changes the operative characteristics of the valve by returning it to the prior art construction.
Figure 7:
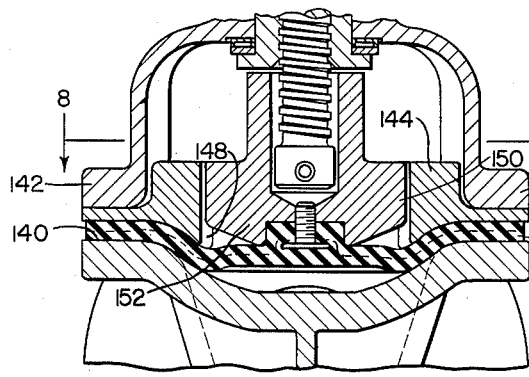
FIGURE 7 is a cross-sectioned end elevation view of still another embodiment of the present invention with the valve shown in the open position.
Figure 8:
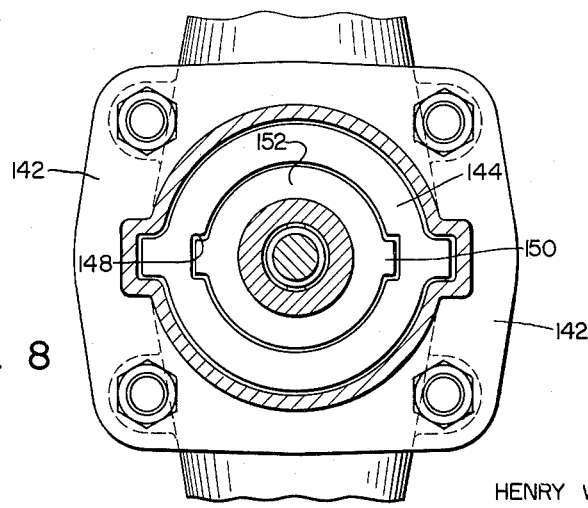
FIGURE 8 is a plan view taken on line 8—8 of FIG. 7.

FIGURES 7 and 8 show that instead of employing a relatively thin plate 74 of FIGS. 1 to 4 (which plate could be stamped article) and instead of making the additional clamping structure integral with the bonnet as in FIG. 5, a relatively thick cast plate 136 may be provided in the same general way as the plate 74 in FIGS. 1 to 4, that is, clamped between a diaphragm periphery 138 on a body opening rim 140 and a bonnet flange 142. The difference between this construction and that of FIGS. 1 to 4 is that because plate 136 is a casting it can conveniently be provided with an upstanding portion 144 inside the bonnet and over the weir 146 to furnish a vertical groove 148 for the "long arm" 150 of the compressor 152 which is like that of FIG. 6.

Figure 9:
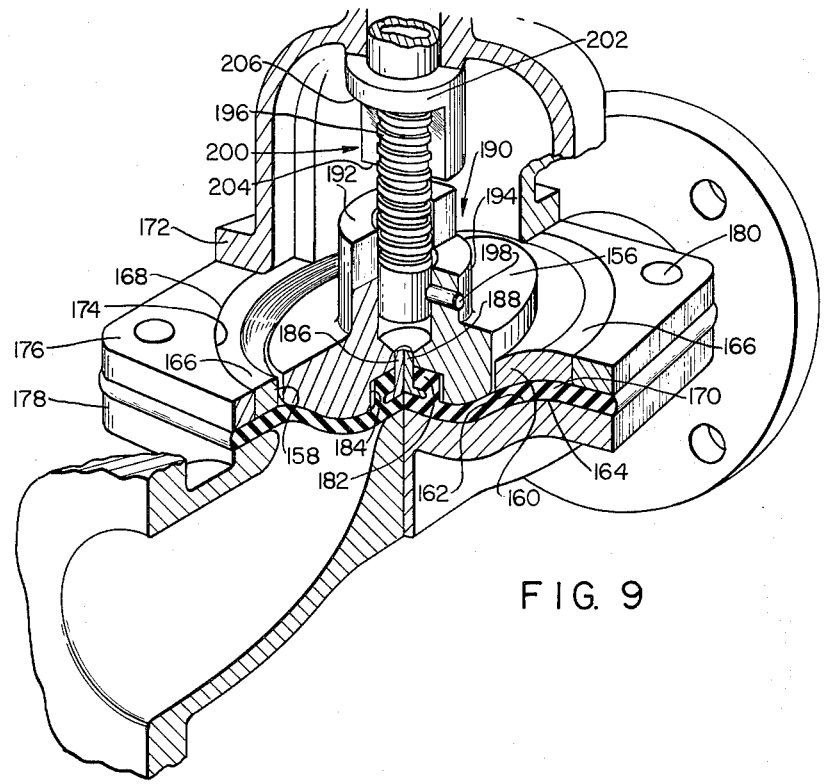
FIGURE 9 is partially cut-away and sectioned perspective view of yet another embodiment of the present invention, with the valve shown in the closed position.
Figure 13:
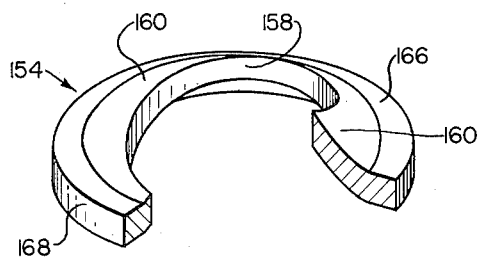
FIGURE 13 is a perspective view of one of the members employed in FIGS. 9–12.

FIGURES 9 to 13 show another embodiment in which the plate 154 is again a casting but so designed with the compressor 156 that by orienting the plate and compressor one way the valve has the full capacity originally intended for the body, diaphragm and bonnet design, and by turning the plate over and orienting it 90° with respect to the one way the valve has a reduced capacity. The latter arrangement is shown in FIG. 9 which shows that because of the oval shape of the compressor 156 and of the opening 158 therefor in the plate 154 there are opposite regions 160 which overlie the outer parts 162 of the curved weir ends and which are so shaped as to hold the diaphragm 164 sealingly clamped against these weir parts. These plate regions 160 extend inwardly from a peripheral region 166 which has an outer circular edge 168 and which is clamped against the diaphragm periphery 170 by the bonnet flange 172. On either side of the regions 160 the inward extension diminishes to nothing at points 90° therefrom because of the oval shape of the opening 158 which touches the planar plate region 166. The concavity of all the inwardly extending regions is constant in this embodiment. The plate 154 is thick enough so that when the compressor is in its uppermost position to open the valve the sides of the compressor are still overlapping the sides of the plate opening 158.

The circular plate edge 168 fits nicely but rotatably within a circular opening 174 in a second plate 176 of the same thickness as plate 154 and overlying all that part of the body flange 178 not covered by the plate periphery 166. The reason for having the outer plate 176 is that the bolt holes 180 are not always equally spaced and a single plate could not be rotated 90° to a new position. Because the inner plate 154 lies within these bolt holes it can be rotated. The peripheral portion 166 of the inner plate 154 preferably has its edge 168 just inside the bolt holes 180 so that the maximum amount of peripheral portion 166 is engaged by the bonnet flange 172 to clamp the diaphragm periphery 170 against the body flange 178. The function of the outer plate 176 is to prevent the distortion which would occur in the diaphragm if the inner plate 154 alone were used. It would be possible, of course, to make a special diaphragm with a periphery co-extensive with the inner plate 154, but it is one feature of the present invention that conventional diaphragms can be used such as those shown and these require an outer plate 176 to prevent curling of the diaphragm edge.

The feature of the FIG. 9 embodiment which most markedly differentiates it from the other embodiments is the convertability to a full-size valve. Thus, by merely (1) unbolting the bonnet from the body (2) turning the plate 154 over (3) rotating the plate 154 and compressor 156 90° and (4) then rebolting the bonnet to the body, the long axes of the oval bonnet 156 and of the plate opening 158 lie along the weir to permit movement of all portions of the diaphragm with respect thereto. No part of the diaphragm is permanently clamped to the outer parts of the curved weir end portions. The turning over of the plate 154 prevents the regions 160 from interfering with the free movement of the diaphragm. In fact these regions are curved upward in substantially the right position to support the diaphragm in its open position.

The diaphragm has a central boss 182 on its back side which fits into a recess 184 therefor in the compressor and which has a stud 186 embedded therein. This stud is threaded into a hole 188 in the compressor, and when the compressor is rotated 90° as above described the stud 186 is loosened or tightened one quarter of a turn. This does not interfere with the diaphragm-compressor connection.

On the top side of the compressor there is an annular boss 190 with one side 192 higher than the other side 194. The valve stem 196 is received in this boss and connected to the compressor by a pivot cross-pin 198. The purpose of the different heights on the opposite sides of the boss 190 is to control the upward movement of the compressor by engagement of the boss 190 with the correspondingly stepped lower end 200 of the bonnet bushing 202. When the parts are in the positions shown in FIG. 9 the higher side 192 engages the lower side 204 on the bushing and the compressor cannot be lifted far enough to damage the compressor-diaphragm connection. However, when the compressor has been repositioned 90° from the position of FIG. 9 the higher side of the compressor boss can rise high enough to engage the higher side 206 on the bushing. This permits the longer travel required when the plate and compressor are indexed 90° from the position shown in FIG. 9.

FIGURES 10 and 12 are plan views of certain parts of the embodiment of FIGS. 9 to 13, and they show the general proportions of these parts better than the perspective views.

I claim:

1. A diaphragm valve comprising:
   (I) a body having:
     (A) a passage therethrough,
     (B) a diaphragm opening which:

(1) is on one side of said passage,
(2) has a rim therearound,
(C) a diaphragm seat which:
(1) is opposite said opening
(2) blends smoothly with said rim,
(II) a diaphragm having:
(A) a peripheral portion overlying said opening rim,
(B) a central portion covering said opening and said seat,
(III) a top works assembly having:
(A) a first portion which clamps said diaphragm peripheral portion to said body opening rim,
(B) a second portion which clamps a part of said diaphragm central portion to a corresponding part of said seat,
(C) a third portion which is movable:
(1) with respect to said first and second top works assembly portions,
(2) toward and away from the remainder of said seat.

2. A diaphragm valve comprising:
(I) a body having:
(A) a passage therethrough,
(B) a diaphragm opening which:
(1) is on one side of said passage,
(2) has a rim therearound,
(C) a diaphragm seat which:
(1) is opposite said opening,
(2) blends smoothly with said rim,
(II) a diaphragm having:
(A) a peripheral portion which:
(1) has one side engaging said opening rim,
(2) has the opposite side presented away from said opening rim,
(B) a central portion which:
(1) covers said opening,
(2) has one side presented toward said seat,
(3) has the opposite side presented away from said seat,
(III) a top works assembly having:
(A) a first portion which:
(1) is presented toward said diaphragm,
(2) has a surface engaging said opposite side of said diaphragm peripheral portion,
(3) clamps said diaphragm peripheral portion to said body opening rim,
(B) a second portion which:
(1) is presented toward said diaphragm,
(2) has a surface engaging a part of the said diaphragm central portion on the said opposite side thereof,
(3) clamps said part of said diaphragm central portion to a corresponding part of said seat,
(C) a third portion which:
(1) is presented toward said diaphragm,
(2) has a surface engaging another part of the said diaphragm central portion on the said opposite side thereof,
(3) is movable with respect to said first and second top works assembly portions toward and away from said seat.

3. A diaphragm valve comprising:
(I) a body having:
(A) a passage therethrough,
(B) a diaphragm opening which:
(1) is on one side of said passage,
(2) has a rim therearound lying in a generally flat plane,
(C) a diaphragm seat which:
(1) is opposite said opening,
(2) blends smoothly and gradually with said rim,
(II) a diaphragm having:
(A) a peripheral portion overlying said opening rim,
(B) a central portion covering said opening and said seat,
(III) means which:
(A) is rigid,
(B) overlies said peripheral diaphragm portion and a part of said central diaphragm portion,
(C) is connected to said body for clamping said peripheral diaphragm portion and said part of said central diaphragm portion to said opening rim and seat, respectively.

4. A diaphragm valve comprising:
(I) a body having:
(A) a passage therethrough,
(B) a diaphragm opening which:
(1) is on one side of said passage,
(2) has a rim therearound lying in a subtially flat plane,
(C) a diaphragm seat which:
(1) is opposite said opening,
(2) extends across said opening,
(3) has a center part,
(4) has end parts blending smoothly and gradually with said rim,
(II) a diaphragm having:
(A) a peripheral portion overlying said opening rim,
(B) a central portion having:
(1) a first part overlying a said end part of said seat,
(2) a second part overlying said center part of said seat,
(III) means which:
(A) is rigid,
(B) overlies both said peripheral diaphragm portion and said first part of said diaphragm central portion,
(C) is connected to said body,
for clamping said peripheral diaphragm portion to said opening rim and for clamping said first part of said diaphragm central portion to said seat end part,
(IV) a compressor which:
(A) overlies the said seat center part,
(B) is connected to said second part of said diaphragm center portion,
(C) is supported on said body,
(D) is movable with respect to said body and said clamping means,
whereby said first part of said diaphragm central portion is held seated against a seat end part while said second part of said diaphragm central portion is moved into and out of engagement with said center seat part to close and open the valve.

5. A diaphragm valve comprising:
(I) a body having:
(A) a passage therethrough,
(B) a diaphragm opening which:
(1) is on one side of said passage,
(2) has a rim therearound lying in a substantially flat plane,
(C) a diaphragm seat which:
(1) is an elongated surface band opposite said opening,
(2) extends across said opening,
(3) has a center part,
(4) has end parts blending smoothly and gradually with said rim,
(II) a diaphragm having:
(A) a peripheral portion overlying said opening rim, (B) a central portion having:
    (1) a first part overlying a said end part of said seat,
    (2) a second part overlying said center part of said seat,
(III) means which:
  (A) is rigid,
  (B) overlies both said peripheral diaphragm portion and said first part of said diaphragm central portion,
    for clamping said peripheral diaphragm portion to said opening rim and for clamping said first part of said diaphragm central portion to said seat end part,
(IV) a bonnet which:
  (A) overlies said clamping means,
  (B) is secured to said body,
(V) a compressor which:
  (A) is mounted on said bonnet,
  (B) overlies said seat center part,
  (C) is connected to said second part of said diaphragm center portion,
  (D) is movable with respect to said body, clamping means and bonnet.

6. A diaphragm valve according to claim 5 wherein said rigid clamping means comprises an annular plate.

7. A diaphragm valve according to claim 6 wherein said center part of the diaphragm seat is spaced from the plane of said rim, wherein said end parts of the diaphragm seat slope toward said diaphragm seat center part from said rim, and wherein said annular plate has a portion which overlies said diaphragm seat end parts and is slopped in accordance therewith.

8. A diaphragm valve in accordance with claim 7 wherein said annular plate has a central opening in which said compressor moves.

9. A diaphragm valve in accordance with claim 8 wherein said plate has a portion which overlies said opening rim, and wherein said plate portions have substantially the same thickness.

10. A diaphragm valve in accordance with claim 9 wherein said bonnet has a guide member, wherein said compressor has a portion which is located on the side of said plate remote from said diaphragm and which engages said guide member.

11. A diaphragm valve in accordance with claim 8 wherein said plate has guide member and wherein said compressor has a portion which engages said guide member.

12. A diaphragm valve in accordance with claim 8 wherein said compressor is oval and wherein said plate opening is oval.

13. A diaphragm valve in accordance with claim 12 wherein the length of said compressor measured along the long axis of the oval substantially equals the length of the seating.

14. A diaphragm valve in accordance with claim 13 wherein the width of said compressor measured along the short axis of the oval is substantially equal to the length of the center part of said diaphragm seat.

15. A diaphragm valve in accordance with claim 14 wherein the inner edge of the sloped plate portion defines the plate opening.

16. A diaphragm valve in accordance with claim 15 wherein the plate and compressor are oriented with the long axes of their oval shapes at some substantial angle to the longitudinal axis of the elongated seat band.

17. A diaphragm valve in accordance with claim 16 wherein said angle is 90°.

18. A diaphragm valve in accordance with claim 12 wherein said plate has a thickness at least as great as the amount of movement of the compressor, whereby said compressor remains in said plate opening and guided thereby when the valve is open.

19. A diaphragm valve in accordance with claim 12 wherein said bonnet has a stop member and wherein said compressor engages said stop member when said diaphragm second part has been lifted a predetermined distance from said seat center part.

20. A diaphragm valve in accordance with claim 12 wherein the portion of said plate which overlies the diaphragm opening rim has a circular outer edge.

21. A diaphragm valve in accordance with claim 20 wherein there is a second annular plate having substantially the same thickness as the portion of said first plate which overlies the opening rim.

22. A diaphragm valve in accordance with claim 21 wherein said second plate has a circular opening receiving said first plate.

23. A diaphragm valve in accordance with claim 12 wherein said plate and said compressor are rotatably adjustable around the axis of said diaphragm opening in said body.

References Cited by the Examiner

UNITED STATES PATENTS 2,855,176  10/58  Boteler     251—331 XR

WILLIAM F. O'DEA, *Primary Examiner.*

ISADOR WEIL, *Examiner.*